US012677803B1

(12) United States Patent
Zhou

(10) Patent No.: US 12,677,803 B1
(45) Date of Patent: Jul. 14, 2026

(54) CAT HARNESS

(71) Applicant: Houmi Zhou, Hangzhou (CN)

(72) Inventor: Houmi Zhou, Hangzhou (CN)

( * ) Notice: Subject to any disclaimer, the term of this patent is extended or adjusted under 35 U.S.C. 154(b) by 0 days.

(21) Appl. No.: 19/272,877

(22) Filed: Jul. 17, 2025

(51) Int. Cl.
    *A01K 27/00* (2006.01)
(52) U.S. Cl.
    CPC .......... *A01K 27/002* (2013.01); *A01K 27/006* (2013.01)
(58) Field of Classification Search
    CPC .. A01K 27/002; A01K 27/006; A01K 27/008; A01K 27/00; A01K 13/003; A01K 13/0034; A01K 27/007
    See application file for complete search history.

(56) References Cited

U.S. PATENT DOCUMENTS

| | | | | |
|---|---|---|---|---|
| 4,091,766 | A | * | 5/1978 | Colliard ............... A01K 27/006 |
| | | | | 359/518 |
| 4,184,452 | A | * | 1/1980 | Buzzell ................ A01K 27/007 |
| | | | | 119/654 |
| 5,632,235 | A | * | 5/1997 | Larsen ................. A01K 27/003 |
| | | | | 119/858 |
| 11,832,591 | B1 | * | 12/2023 | Xu ....................... A01K 27/006 |
| 2008/0008731 | A1 | * | 1/2008 | Hurwitz ............... A01K 27/007 |
| | | | | 424/409 |
| 2010/0263602 | A1 | * | 10/2010 | Cho ..................... A01K 27/002 |
| | | | | 119/792 |
| 2012/0024239 | A1 | * | 2/2012 | Forbes ................. A01K 27/002 |
| | | | | 119/863 |

| | | | | |
|---|---|---|---|---|
| 2013/0199459 | A1 | * | 8/2013 | Sebo ..................... A01K 13/003 |
| | | | | 119/860 |
| 2019/0373860 | A1 | * | 12/2019 | Kath ..................... A01K 13/006 |
| 2020/0113156 | A1 | * | 4/2020 | Copeland ............. A01K 27/006 |
| 2022/0142124 | A1 | * | 5/2022 | Stevens ................ A01K 27/002 |
| 2023/0247968 | A1 | * | 8/2023 | Maremont ........... A01K 13/006 |
| | | | | 119/792 |
| 2023/0389523 | A1 | * | 12/2023 | Pawlick ............... A01K 29/005 |

(Continued)

FOREIGN PATENT DOCUMENTS

| | | | | |
|---|---|---|---|---|
| CN | 214294868 | U | * | 9/2021 |
| DE | 202015102946 | U1 | * | 9/2016 ............... B68B 1/00 |

OTHER PUBLICATIONS

CN_214294868_U translation (Year: 2021).*
DE_202015102946_U1 translation (Year: 2016).*

*Primary Examiner* — Katelyn T Truong
(74) *Attorney, Agent, or Firm* — Birchwood IP

(57) ABSTRACT

A cat harness, which includes an upper pad and a lower pad, an adjustable buckle strap component arranged between the upper pad and the lower pad; breathable sandwich structures provided in the upper and lower gaskets; and a nighttime reflective structure; the unique ergonomic handle of the cat harness of the present disclosure not only makes daily cat lifting easy and effortless, but also enables rapid and precise control of cats in emergency situations, thereby improving emergency speed and ensuring safety. The high-strength mesh and heat dissipation micropores are matched for good breathability, which can timely dissipate the heat and moisture on the cat's body surface, keep it dry, reduce discomfort and disease risks. The reflective strip in key areas enhances night visibility, and the Y-shaped lower gasket fits the neck, combined with a plurality of adjustable buckle straps and double buckles, to ensure breathing and prevent escape.

15 Claims, 7 Drawing Sheets

(56)     References Cited

U.S. PATENT DOCUMENTS

| | | | |
|---|---|---|---|
| 2024/0099269 A1* | 3/2024 | Chang | A01K 27/00 |
| 2024/0138376 A1* | 5/2024 | Kilborn | A01K 27/002 |
| 2024/0300212 A1* | 9/2024 | Zhou | D04B 21/08 |
| 2024/0365754 A1* | 11/2024 | Pezeshki | A01K 27/006 |
| 2025/0064022 A1* | 2/2025 | Liu | A01K 27/002 |
| 2025/0324947 A1* | 10/2025 | Freeman | A01K 27/006 |

* cited by examiner

CAT HARNESS

TECHNICAL FIELD

The present disclosure relates to the field of pet supplies and pet technologies, and in particular, to a cat harness.

BACKGROUND

With the flourishing of pet culture, pet cats have gradually become indispensable companions for many families due to their gentle and cute personality, elegant and charming posture. In the daily life of cats, outdoor activities not only help their physical and mental health, but also enhance emotional communication with their owners. Therefore, as a necessary equipment for cats to go out, the rationality of cat harness design directly affects the comfort, safety and user experience of cats.

However, there are many shortcomings in the design of cat harness products on the current market. Most cat harness products on the market follow the design concept of dog harness, and fail to fully consider the unique physiological and behavioral characteristics of cats. From a specific design perspective, most cat harness products have a simple strap structure, which is relatively easy to wear, but exposes many problems in actual use.

1. In terms of daily use, existing cat harness generally lack a handle structure that is convenient for owners to lift. When cats suddenly rush towards dangerous areas outdoors, such as dangerous animals on the road or in the grass, owners find it difficult to quickly and effectively lift them, which lacks effective emergency measures. This undoubtedly poses a great safety hazard to cats.

2. The breathability of the material is also a major weakness of the existing cat harness. The heat dissipation of cats' body surface mainly relies on respiration and skin heat dissipation. However, the breathability of the existing cat harness materials is poor. After cats wear them for a long time, the heat and moisture generated on the body surface are difficult to dissipate, which can easily cause the cat's skin to become damp, leading to skin problems such as eczema, dermatitis, etc., seriously affecting the cat's health.

3. In terms of anti-suffocation and anti-escape design, the existing cat harness also have obvious defects. The connection parts are easy to loosen, which cannot effectively restrain the cat, it is caused to easily break free during activities. Moreover, the neck design is unreasonable and does not fully consider the physiological structure of the cat's neck. Cats are prone to respiratory obstruction during activities, thereby affecting their normal breathing.

4. Furthermore, most cat harness products have poor visibility at night. In low light or dark environments, when cats wear these cat harness products to go out, it is difficult for passing vehicles and pedestrians to detect them in a timely manner, which poses a great safety hazard for travel.

5. At the same time, the current product structure and material of cat harness are single and cannot be adjusted according to seasonal changes. In summer, they cannot effectively dissipate heat, and cats may feel stuffy and uncomfortable after wearing them. In winter, it cannot provide good warmth and meet the travel needs of cats in different seasons.

In summary, there are many urgent problems in the design of cat harness products on the market, which cannot provide a safe, comfortable, and convenient user experience for cats and their owners. Therefore, it is of great practical significance to develop a cat harness product that fully considers the physiological and behavioral characteristics of cats and has a plurality of innovative designs.

SUMMARY

The purpose of the present disclosure is to provide a cat harness to solve problems raised in the background technology mentioned above.

To achieve the above objectives, the present disclosure provides the following technical solution: a cat harness, including an upper gasket and a lower gasket, where the cat harness further includes:

an emergency carrying structure provided at a top of the upper gasket;

an adjustable buckle strap component provided between the upper gasket and the lower gasket;

breathable sandwich structures provided in the upper gasket and the lower gasket;

a nighttime reflective structure;

a detachable coating structure provided on an inner surface of the lower gasket;

the lower gasket has a Y-shaped pattern.

In some embodiments of the present disclosure, the emergency carrying structure includes a handle provided on a top surface of the upper gasket, and two ends of the handle are respectively sewn and fixed to the top surface of the upper gasket.

In some embodiments of the present disclosure, a rear end of the handle is provided with a connection ring, and the connection ring is D-shaped.

In some embodiments of the present disclosure, the adjustable buckle strap component includes a first adjustable buckle strap, a second adjustable buckle strap, a locking buckle, and a buckle strap, where two sides of front ends of the lower gasket and the upper gasket are connected to the first adjustable buckle strap; two sides of rear ends of the lower gasket and the upper gasket are connected to the second adjustable buckle strap, the locking buckle is further provided at a connection between the second adjustable buckle strap and the upper gasket; the locking buckle is connected to the upper gasket through the buckle strap.

In some embodiments of the present disclosure, an edge wrapping cloth is provided at four corners of the upper gasket, a top of the buckle strap and a top of the first adjustable buckle strap are sewn and fixed on an inner side of the edge wrapping cloth.

In some embodiments of the present disclosure, the nighttime reflective structure includes a plurality of high-strength reflective strips provided on the upper gasket, the lower gasket, the handle, the first adjustable buckle strap, and the second adjustable buckle strap.

In some embodiments of the present disclosure, the breathable sandwich structure includes a PP cotton sandwich layer and heat dissipation micropores; both the upper gasket and the lower gasket are made of high-strength mesh material with excellent breathability; surfaces of the upper gasket and the lower gasket are uniformly distributed with the heat dissipation micropores; PP cotton sandwich layers are provided inside the upper gasket and the lower gasket.

In some embodiments of the present disclosure, the detachable coating structure includes a detachable medication patch provided on an inner side of the lower gasket, and a top surface of the detachable medication patch is provided with the medication sponge.

In some embodiments of the present disclosure, the detachable coating structure further includes a plurality of positioning Velcro™ A surfaces fixed on an inner side of the lower gasket, a plurality of positioning grooves corresponding to the positioning Velcro™ A surfaces provided on a bottom surface of the detachable medication patch; a positioning Velcro™ B surface fixed on an inner side of the positioning grooves; a top surface of the detachable medication patch is provided with an installation groove for embedding and installing the medication sponge, and the medication sponge is glued and fixed in the installation groove.

Compared with the existing technology, the beneficial effects of the present disclosure are as follows.

1. Convenient carrying and emergency response: the unique ergonomic handle makes daily cat lifting easy and effortless, avoiding hand fatigue. In emergency situations, it can quickly and accurately control cats, shorten response time, greatly improve emergency speed, and ensure cat safety.

2. Comfortable and breathable design: the combination of high-strength mesh fabric and heat dissipation micropores provides excellent breathability, timely dissipating heat and moisture from the cat's body surface, keeping it dry, reducing stuffiness and discomfort, lowering the risk of skin diseases, and improving wearing comfort.

3. Night visibility design: high intensity reflective strips are installed in key areas, which reflect strongly when exposed to light at night, significantly improving visibility and ensuring all-round safety during nighttime travel, thereby reducing traffic accidents and unexpected risks, and rendering travel more reassuring.

4. Anti-suffocation and anti-escape design: the Y-shaped lower gasket fits the neck to avoid pressure and ensure smooth breathing; a plurality of adjustable buckle straps and double buckles enhance stability, effectively preventing escape and allowing owners to better control their cats' movements.

5. Seasonal adaptability design: spraying water in summer causes the PP cotton sandwich layer to evaporate and absorb heat, which results in efficient cooling. The winter sandwich layer stores heat, provides good insulation, meets the needs of different seasons, reduces cat discomfort, and lowers the risk of illness.

Numeral reference: 1—upper gasket; 11—edge wrapping cloth; 2—lower gasket; 3—handle; 31—connection ring; 41—first adjustable buckle strap; 42—second adjustable buckle strap; 43—locking buckle; 44—buckle strap; 5—detachable coating structure; 51—detachable medication patch; 511—installation groove; 52—medication sponge; 53—positioning Velcro™ A surface; 54—positioning groove; 55—positioning Velcro B™ surface; 6—PP cotton sandwich layer.

DESCRIPTION OF EMBODIMENTS

Below, the technical solutions in the embodiments of the present disclosure will be clearly and completely described in combination with the accompanying drawings. Obviously, the described embodiments are only a part of the embodiments of the present disclosure, not all of them. Based on the embodiments of the present disclosure, all other embodiments obtained by those skilled in the art without creative work are within the protection scope of the present disclosure.

Figure 1:
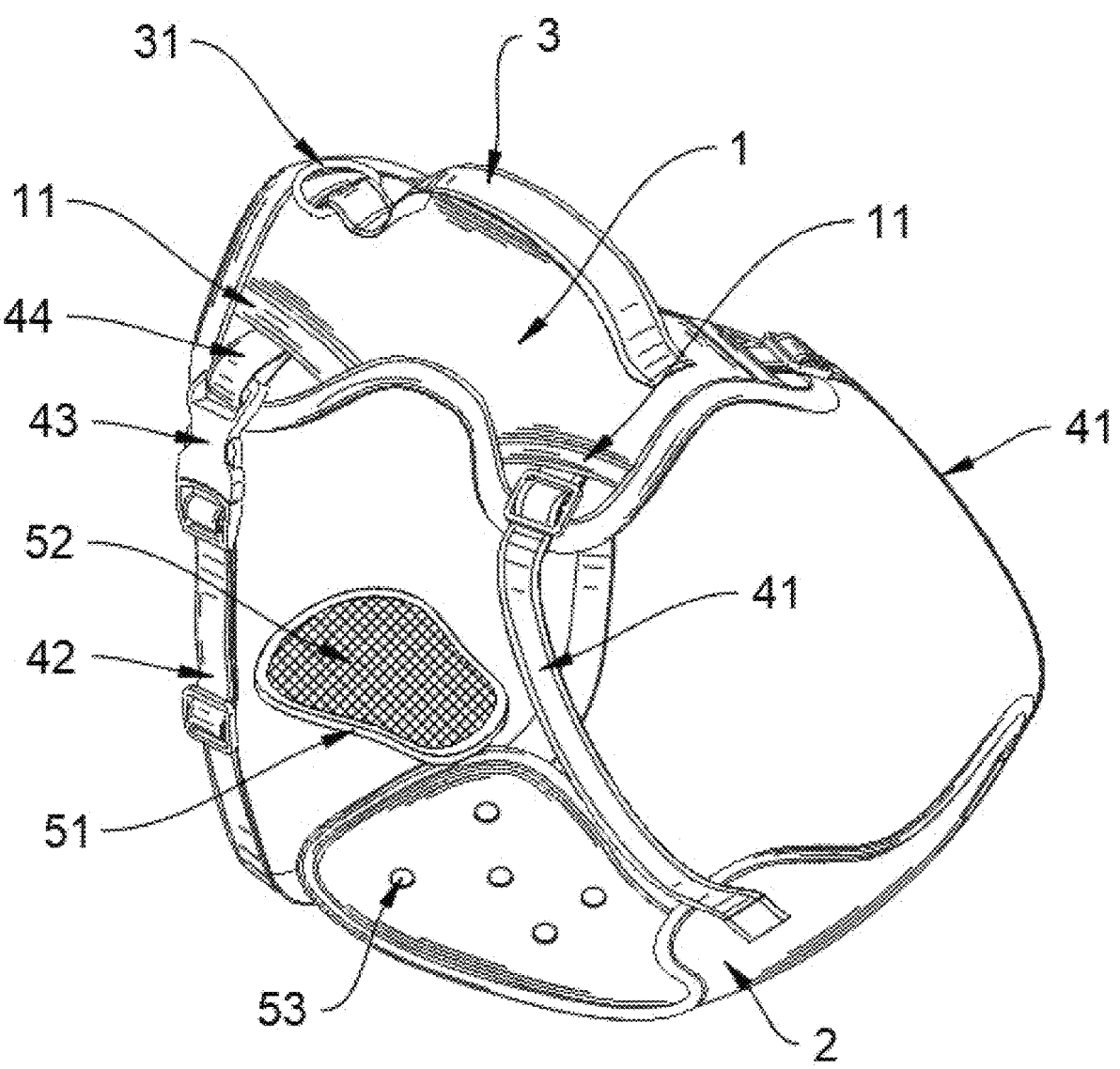
FIG. 1 is a three-dimensional schematic diagram of the present disclosure.
Figure 2:
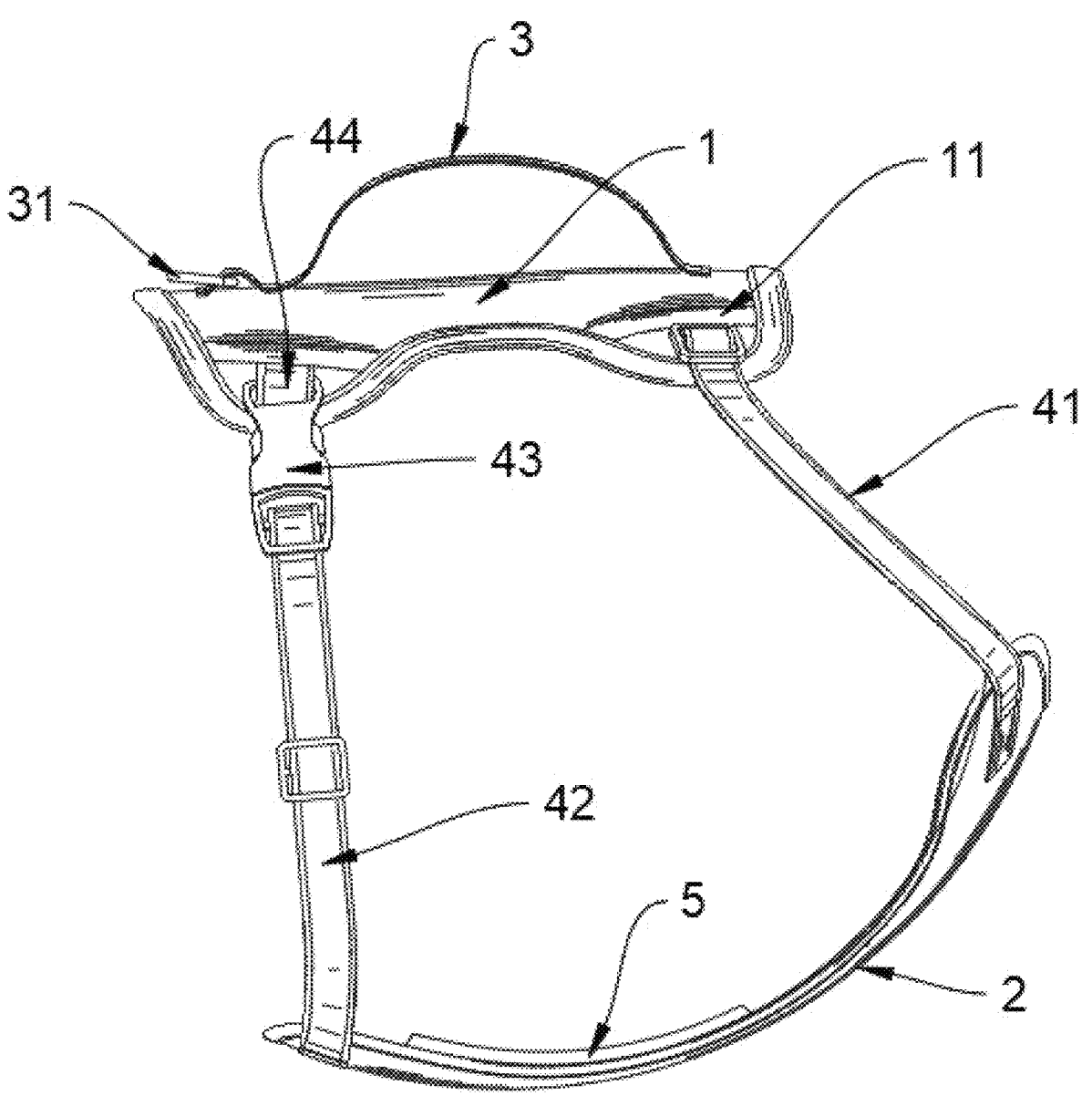
FIG. 2 is a front view of the present disclosure.
Figure 3:
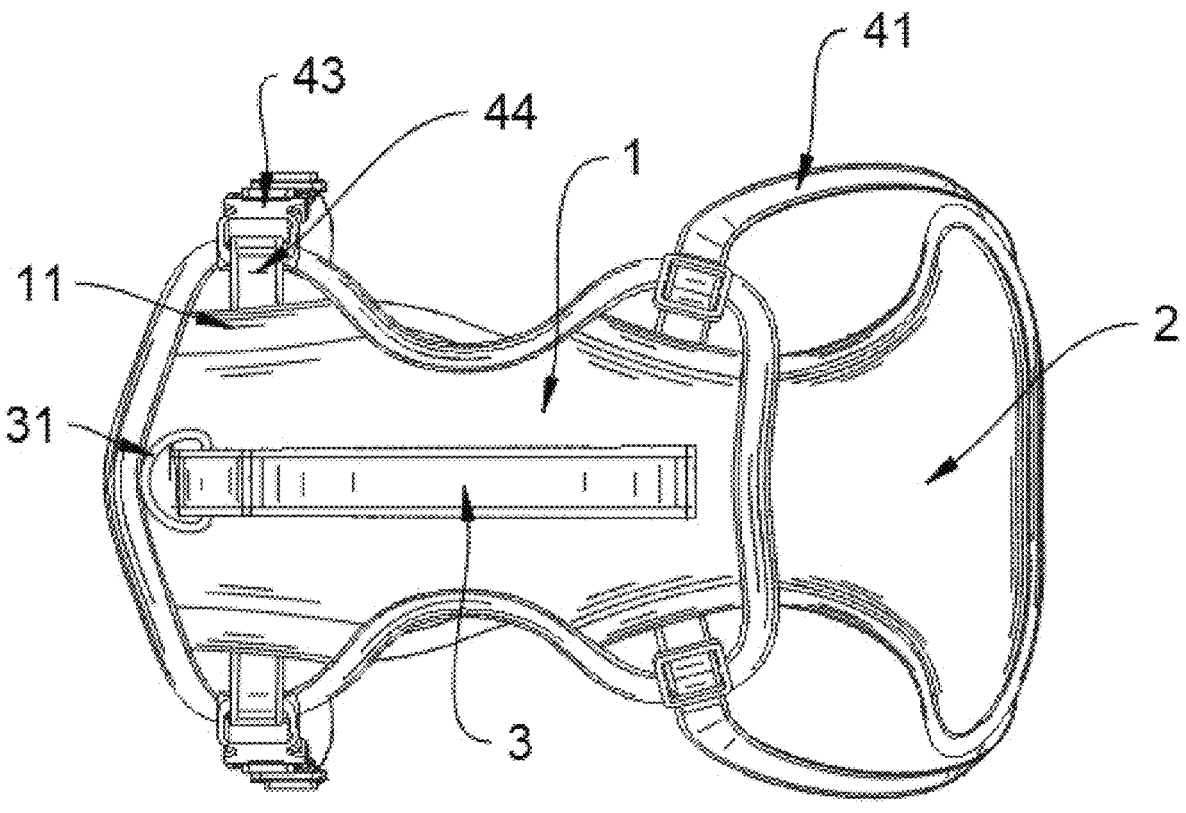
FIG. 3 is a top view of the present disclosure.
Figure 4:
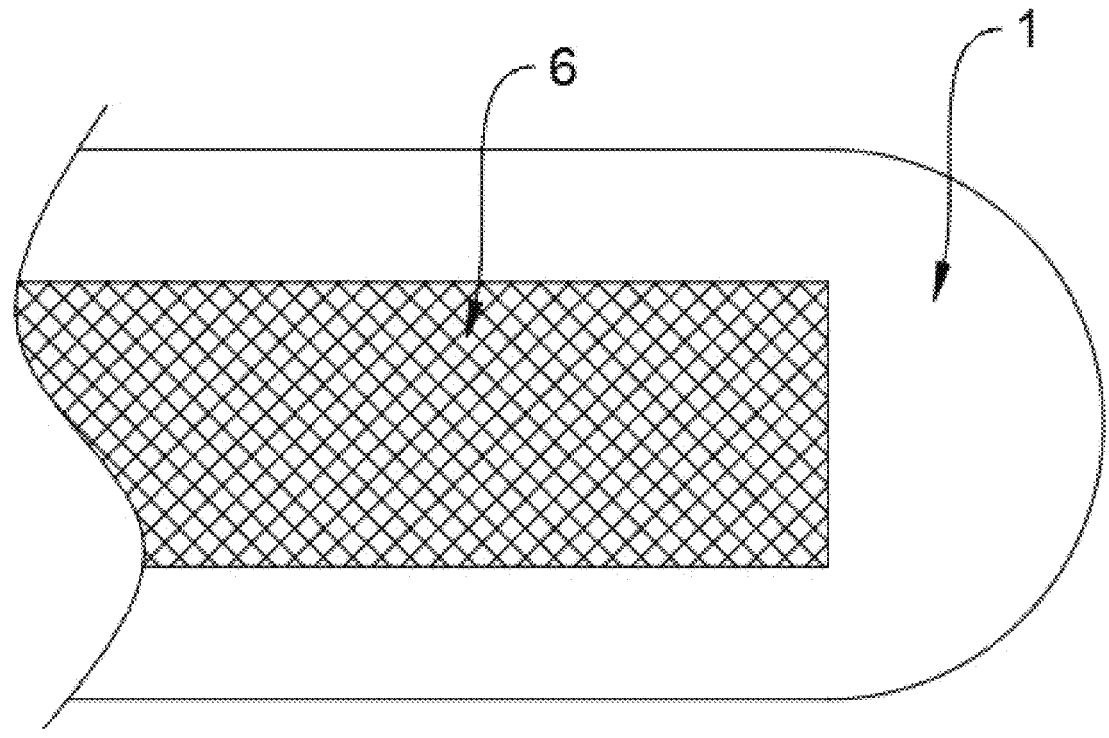
FIG. 4 is a partial cross-sectional view of a gasket of the present disclosure.

Please refer to FIGS. 1 to 4. This embodiment provides the following technical solution: a cat harness, including an upper gasket 1 and a lower gasket 2, and the cat harness further includes:

an emergency carrying structure provided at a top of the upper gasket 1;

an adjustable buckle strap component provided between the upper gasket 1 and the lower gasket 2;

breathable sandwich structures provided in the upper gasket 1 and the lower gasket 2;

a nighttime reflective structure;

the lower gasket 2 has a Y-shaped shape, which is more in line with the physiological structure of the cat's neck, thereby avoiding pressure on the neck and ensuring smooth breathing for the cat when wearing it.

In an implementation mode, the emergency carrying structure includes a handle 3 provided on a top surface of the upper gasket 1, and two ends of the handle 3 are sewn and fixed to the top surface of the upper gasket 1. The design of the handle 3 conforms to ergonomics, thereby providing comfortable grip and easy lifting for a user. This allows pet owners to quickly lift their pets by pulling the handle 3, such as when the cat suddenly rushes to a dangerous area. This greatly improves the emergency response speed and provides a solid guarantee for the safety of the cat.

In an implementation mode, a connection ring 31 is further provided at a rear end of the handle 3, and the connection ring 31 is D-shaped. The connection ring 31 is made of material which is not limited to stainless-steel material, such as plastics, which facilitates the user to connect a leash in the future and allows the user to lead the cat through the leash, thereby increasing the usage scenario and flexibility of the cat's chest backpack.

In an implementation mode, the adjustable buckle strap component includes a first adjustable buckle strap 41, a second adjustable buckle strap 42, a locking buckle 43, and a buckle strap 44. Two sides of front ends of the lower gasket 2 and the upper gasket 1 are connected to the first adjustable buckle strap 41, and two ends of rear ends of the lower gasket 2 and the upper gasket 1 are connected to the second adjustable buckle strap 42. A locking buckle 43 is further provided at a connection between the second adjustable buckle strap 42 and the upper gasket 1. The locking buckle 43 is connected to the upper gasket 1 through the buckle strap 44, and an adjustable design of the first adjustable buckle strap 41 and the second adjustable buckle strap 42 is convenient for adjusting the tension according to the actual body shape of the cat. The design of the locking buckle 43 further increases the cat's chest backpack. The overall stability and safety after wearing effectively prevent cats from escaping. At the same time, based on the easy disassembly feature of the locking buckle 43, it is also convenient for the user to put on or take off the cat's chest backpack during actual use, which improves usability.

In an implementation mode, an edge wrapping cloth 11 is provided at four corners of the upper gasket 1, and a top of the buckle strap 44 and a top of the first adjustable buckle strap 41 are sewn and fixed to an inner side of the edge wrapping cloth 11. The design of the edge wrapping cloth 11 ensures that sewing points of the first adjustable buckle strap 41 and the buckle strap 44 can be protected, thereby avoiding damage and ensuring the long-term service life of the entire cat harness.

In an implementation mode, the nighttime reflective structure includes a plurality of high-intensity reflective strips provided on the upper gasket 1, the lower gasket 2, the handle 3, the first adjustable buckle strap 41, and the second adjustable buckle strap 42. These reflective strips can produce strong reflective effects when exposed to light at night, significantly improving the visibility of the cat's chest backpack, thereby ensuring the safety of pet owners and cats walking at night.

In an implementation mode, the breathable sandwich structure includes a PP cotton sandwich layer 6 and heat dissipation micropores. Both the upper gasket 1 and the lower gasket 2 are made of high-strength mesh material with excellent breathability, and surfaces of the upper gasket 1 and the lower gasket 2 are uniformly distributed with the heat dissipation micropores. These micropores significantly enhance the breathability without affecting the overall structural strength of the chest backpack, allowing the cat's body surface to remain dry when wearing, effectively reducing discomfort caused by stuffiness. Both the upper gasket 1 and the lower gasket 2 are provided with a PP cotton sandwich layer 6 inside. This design allows the user to quickly evaporate and absorb heat by spraying water on the PP cotton sandwich layer 6 during summer, thereby achieving efficient cooling of the upper gasket 1 and the lower gasket 2. It can also tightly store heat in winter, providing good warmth for cats, thus meeting the needs of different seasons and increasing seasonal adaptability.

Figure 5:
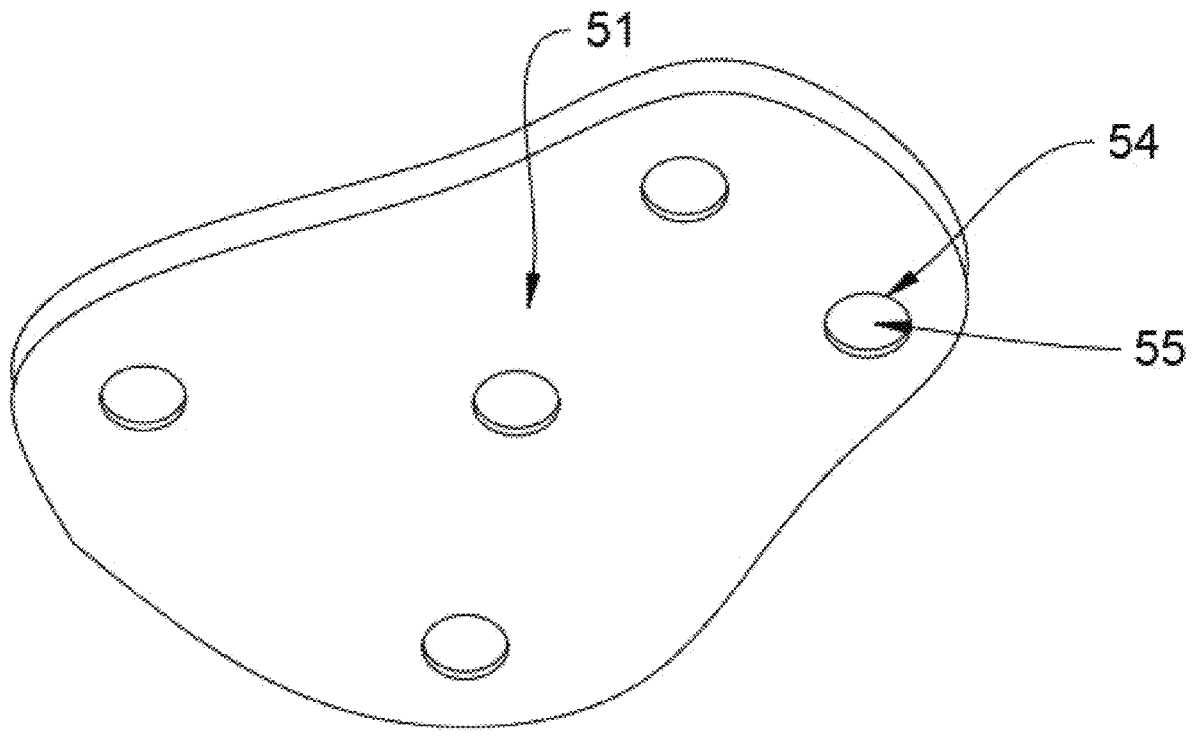
FIG. 5 is a bottom perspective view of a detachable medicated patch of the present disclosure.
Figure 6:
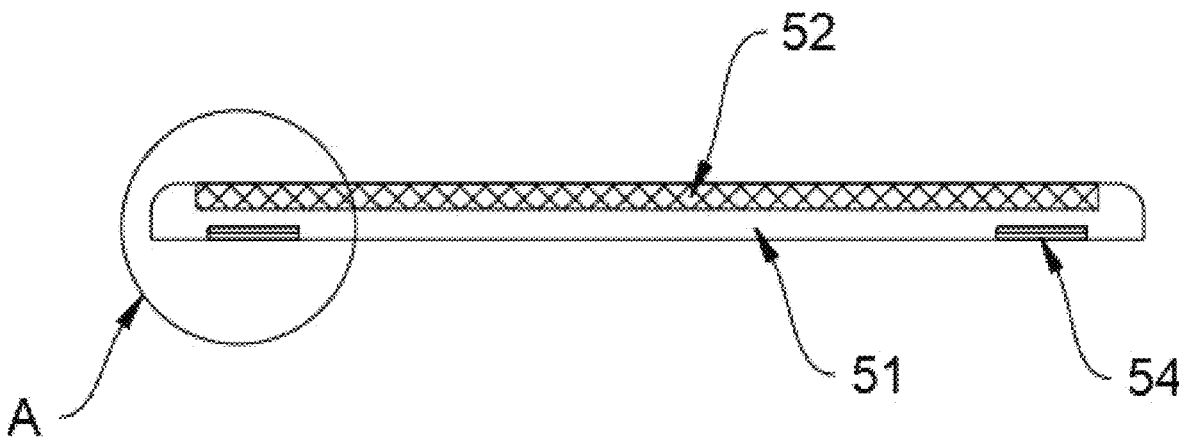
FIG. 6 is a sectional view of the detachable medicated patch of the present disclosure.
Figure 7:
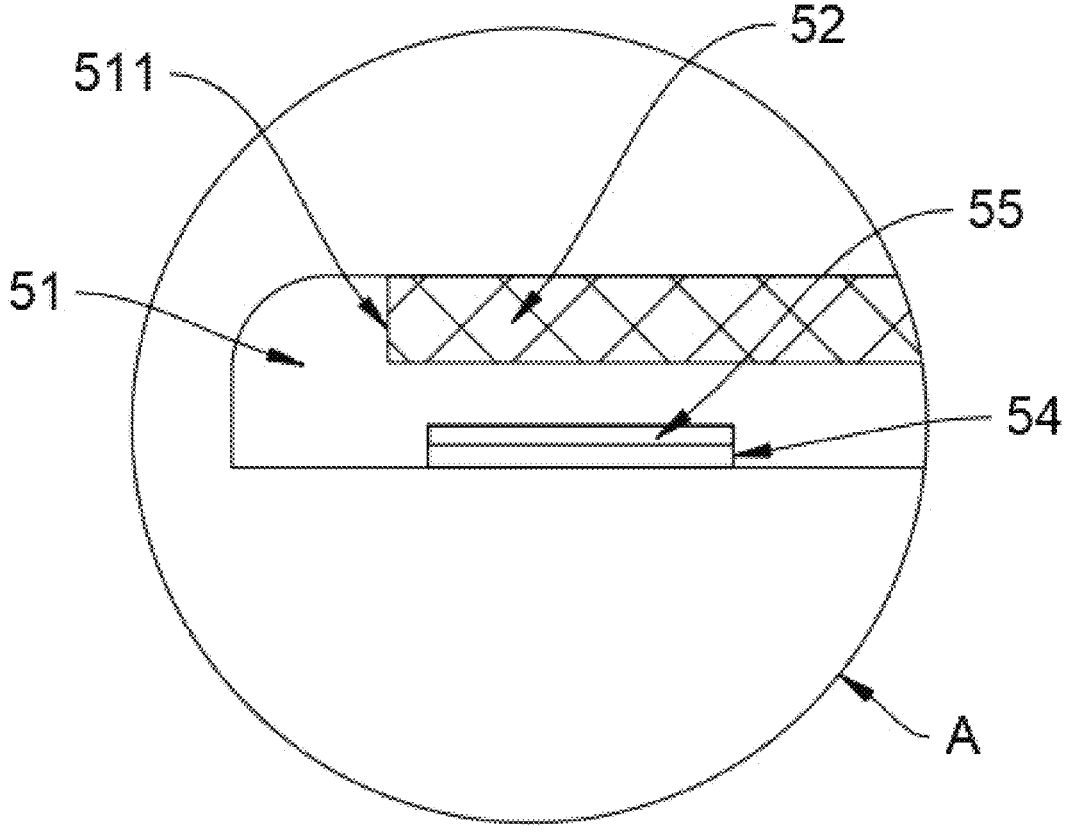
FIG. 7 is an enlarged partial view of area A in FIG. 6 of the present disclosure.

Please refer to FIGS. 1 to 7, a detachable coating structure 5 is arranged on an inner surface of the lower gasket 2.

In an implementation mode, the detachable coating structure 5 includes a detachable medication patch 51 that can be provided on an inner side of the lower gasket 2. A top surface of the detachable medication patch 51 is provided with a medication sponge 52. In actual use, the user can choose whether to install the detachable medication patch 51 according to their actual needs. For example, when a cat's abdominal skin has fungal skin diseases, according to the antifungal medication prescribed by a pet doctor, the antifungal medication can be sprayed or applied on the medication sponge 52. The medication sponge 52 is made of sponge material that can absorb a certain amount of antifungal medication. Then, the detachable medication patch 51 can be provided on an inner side of the lower gasket 2, and the cat's chest backpack can be worn normally by the cat. At this time, the cat's chest backpack will have an auxiliary medication application function. With the auxiliary application function, it can be worn on the chest backpack of cats while assisting in the treatment of fungal skin diseases on the abdomen, and during this process, the coverage of the lower gasket 2 can also prevent cats from licking the antifungal drugs on their abdomen during the application process. In a later stage, only the detachable medication patch 51 needs to be regularly removed and replaced. When the application function is not needed in daily life, there is no need to install the detachable medication patch 51, which has high flexibility and further meets different usage needs.

In an implementation mode, a detachable coating structure 5 further includes a plurality of positioning Velcro™ A surface 53 fixed on an inner side of the lower gasket 2, a plurality of positioning grooves 54 corresponding to the plurality of positioning Velcro™ A surface 53 provided on a bottom surface of the detachable medication patch 51, and a positioning Velcro™ B surface 55 fixed on an inner side of the positioning grooves 54, so that when the detachable medication patch 51 is installed, it can be attached to an inner side of the lower gasket 2, allowing the positioning Velcro™ A surface 53 to enter an inner side of the positioning grooves 54 and connect with the positioning Velcro™ B 55 together, the detachable medication patch 51 can be stably installed, and it is also convenient for subsequent operators to quickly remove and replace the detachable medication patch 51. A top surface of the detachable medication patch 51 is provided with an installation groove 511 configured for the medication sponge 52 to be embedded and installed, and the medication sponge 52 is glued and fixed in the installation groove 511, thereby achieving a stable installation of the medication sponge 52.

Although the embodiments of the present disclosure have been shown and described (as detailed above), it will be understood by those skilled in the art that various changes, modifications, substitutions, and variations can be made to these embodiments without departing from the principles and spirit of the present disclosure. The scope of the present disclosure is limited by the appended claims and their equivalents.

What is claimed is:

1. A cat harness, comprising: an upper gasket and a lower gasket,
   wherein the cat harness further comprises:
   an emergency carrying structure provided at a top of the upper gasket;
   an adjustable buckle strap component provided between the upper gasket and the lower gasket;
   breathable sandwich structures provided in the upper gasket and the lower gasket;
   a nighttime reflective structure; and
   a detachable coating structure that is provided on an inner side of the lower gasket,
   wherein the detachable coating structure comprises a detachable medication patch provided on the inner side of the lower gasket; a top surface of the detachable medication patch is provided with a medication sponge;
   wherein the top surface of the detachable medication patch is further provided with an installation groove for embedding and installing the medication sponge, and the medication sponge is glued and fixed in the installation groove.

2. The cat harness according to claim 1, wherein the emergency carrying structure comprises a handle provided on a top surface of the upper gasket, and two ends of the handle are respectively sewn and fixed to the top surface of the upper gasket.

3. The cat harness according to claim 2, wherein a rear end of the handle is provided with a connection ring, and the connection ring is D-shaped.

4. The cat harness according to claim 3, wherein the adjustable buckle strap component comprises a first adjustable buckle strap, a second adjustable buckle strap, a locking buckle, and a buckle strap.

5. The cat harness according to claim 4, wherein two sides of front ends of the lower gasket and the upper gasket are connected to the first adjustable buckle strap;
   two sides of rear ends of the lower gasket and the upper gasket are connected to the second adjustable buckle strap.

6. The cat harness according to claim 5, wherein the locking buckle is further provided at a connection between the second adjustable buckle strap and the upper gasket;

the locking buckle is connected to the upper gasket through the buckle strap.

7. The cat harness according to claim 6, wherein an edge wrapping cloth is provided at four corners of the upper gasket.

8. The cat harness according to claim 7, wherein a top of the buckle strap is sewn and fixed on an inner side of the edge wrapping cloth.

9. The cat harness according to claim 7, wherein a top of the first adjustable buckle strap is sewn and fixed on an inner side of the edge wrapping cloth.

10. The cat harness according to claim 9, wherein the nighttime reflective structure comprises a plurality of high-strength reflective strips provided on the upper gasket, the lower gasket, the handle, the first adjustable buckle strap, and the second adjustable buckle strap.

11. The cat harness according to claim 1, wherein polypropylene, (PP) cotton sandwich layers are provided inside the upper gasket and the lower gasket.

12. The cat harness according to claim 1, wherein the lower gasket has a Y-shaped design.

13. The cat harness according to claim 1, wherein the detachable coating structure further comprises a detachable structure that is located between the detachable medication patch and the medication sponge.

14. The cat harness according to claim 13, wherein the detachable coating structure further comprises a plurality of first positioning surfaces fixed on an inner side of the lower gasket, a plurality of positioning grooves corresponding to the first positioning surfaces provided on a bottom surface of the detachable medication patch;

a second positioning surface fixed on an inner side of the positioning grooves.

15. The cat harness according to claim 14, wherein the first positioning surfaces are clamped into inner sides of the positioning grooves and attached to the second positioning surface.

* * * * *